United States Patent Office 2,818,650
Patented Jan. 7, 1958

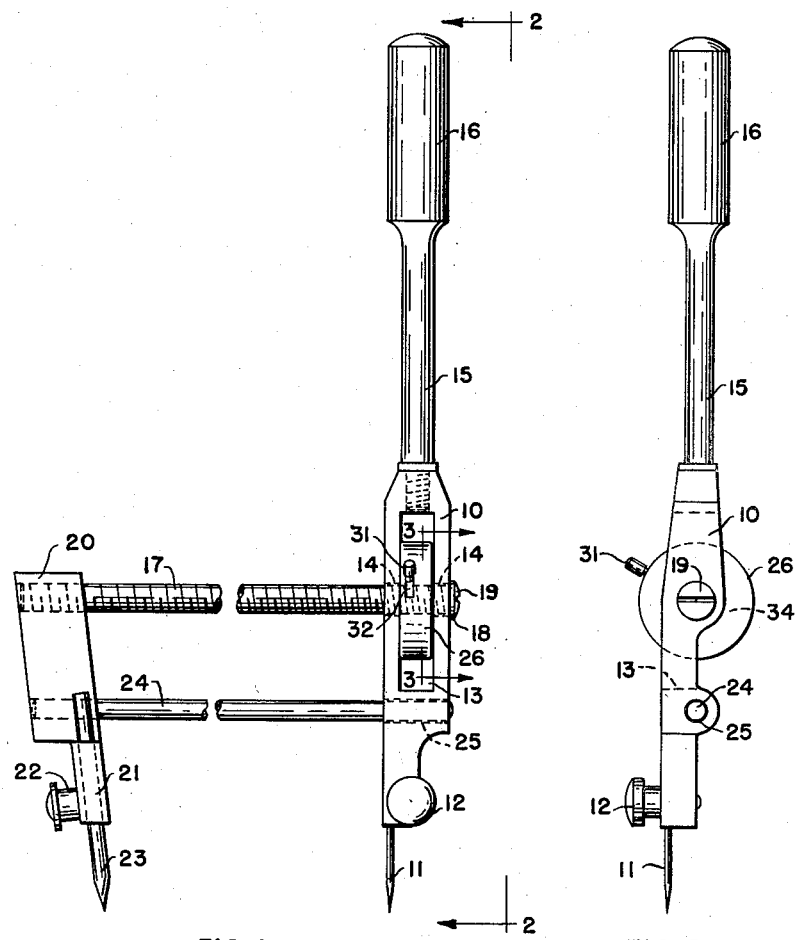
FIG. 1  FIG. 2
FIG. 3  FIG. 4
*INVENTOR.*
STEPHEN J. KANUCH
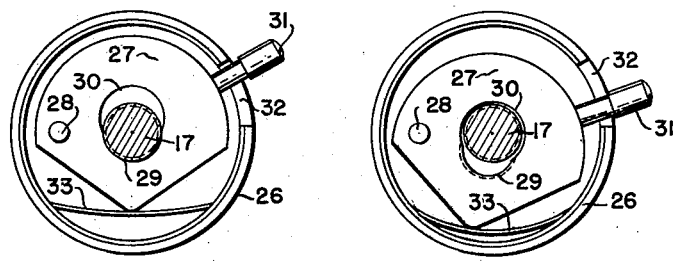

2,818,650

COMPASS

Stephen J. Kanuch, Bridgeport, Conn.

Application June 4, 1954, Serial No. 434,537

4 Claims. (Cl. 33—27)

The present invention relates to drafting instruments, and particularly to a new and improved compass or scribing device embodying features facilitating its rapid adjustment as well as providing a sturdy construction.

Prior known compasses require considerable time to adjust them to different radii throughout their range of operation because they employ a fine micrometer type of screw and nut device. When it is considered that the user of such instruments is required to make such adjustments a great many times each hour during his normal activity, any saving in time of adjusting the compass adds to his productivity.

Prior known compasses are so constructed that they embody inherent weaknesses, particularly when the compass is adjusted for making relatively small circles. Particularly is this weakness apparent when it is desired to make a relatively small circle in dotted, or dot and dash line construction.

The primary object of the present invention is to provide a compass or scribing device that will obviate the above as well as other difficulties.

Other objects include the provision of a compass or a scribing device in which a threaded screw and nut construction is employed for accurately moving the elements of the compass or scriber and in which means is provided for permitting instant movement of the movable legs of the compass independently of the threads between the nut and screw; the provision of such a compass or scriber in which a rotatable nut is employed for accurately adjusting the relatively movable legs of the compass and which nut embodies within its construction, a thread releasing mechanism for facilitating instant adjustment of the movable legs of the compass to any point within its range of adjustment; the provision of such a compass or scriber in which a hollow, cylindrical member includes within its confines a half-nut element that is resiliently urged into threading engagement with a threaded rod extending through the hollow disc; the provision of such a compass or scriber in which the half-nut element is pivotally mounted within the hollow disc, and is resiliently urged into threading engagement with a threaded rod that extends through the hollow disc; the provision of such a compass or scriber in which parallel links connect the movable legs of the compass or scriber to thereby provide a rigid construction at all points of adjustment of the movable legs; and the provision of such a compass or scriber including a half-nut element resiliently urged into cooperating relation with a threaded rod extending between the adjustable legs of the compass or scriber, and an auxiliary bar is provided between the legs in parallel relation with the threaded bar.

The above as well as other objects and novel features of the invention will become apparent from the following specification and accompanying drawings in which:

Figure 1 is an elevational view of a compass or scriber to which the principles of the invention have been applied;

Fig. 2 is an end elevational view looking along line 2—2 of Fig. 1;

Fig. 3 is a sectional elevational view taken substantially along line 3—3 of Fig. 1; and Fig. 4 is a view similar to Fig. 3, with the parts in an adjusted position.

Referring to Figs. 1 and 2, the principles of the invention are shown as applied to a compass including a body portion 10 to the lower end of which is provided a centering point 11 adjustably held within the body portion 10 by a thumb screw 12. The body portion 10 is provided with a rectangularly shaped recess 13 extending transversely through the body 10 for a purpose to be described later. A plain, cylindrical hole 14 also extends transversely through the body portion 10, but at right angles to the recess 13. A stem 15 extends upwardly from the body 10 and includes a knurled portion 16 for facilitating the use of the compass. A threaded shaft 17 slidingly passes through the cylindrical hole 14, and spans the recess 13 within the body portion 10. A washer 18 and a screw 19 fixed to the right-hand end of the threaded shaft 17, prevent the leftward movement of the screw 17 beyond the point where the washer 18 abuts the body member 10 (Fig. 1). The end of the threaded shaft 17 opposite that in which the screw 19 is located is threaded into a scribe-support 20. The scribe-support 20 is provided with the usual tubular scribe-receiving element 21, and a thumb screw 22 for adjustably locking the scribing element 23 adjustably within the tubular element 21. A rod 24 is fixed to the scribe-support 20, is arranged in parallel relation to the screw 17, and slidingly extends through a cylindrical opening 25 within the body member 10. The construction and arrangement of the parts thus far described provide a rigid linkage for supporting a scriber 23 and a centering element 11 in fixed relationship to each other regardless of the amount of separation of the two elements 23 and 11.

In order to accurately adjust the movement of the scribing element 23 relatively to the centering point 11, a hollow, disc-like member 26 is located within the recess 13, and through which the threaded shaft 17 extends. The member 26 acts as a nut in cooperation with the threaded shaft 17, so that rotation of the hollow disc 26 with its cooperating nut mechanism causes the threaded shaft 17 and the rod 24 to move axially, thereby causing movement of the scriber 23 and the centering point 11 toward and away from each other. Referring to Figs. 3 and 4, the hollow, disc-like element 26, in the present embodiment, has a fan-shaped cam element 27 located within its confines. Although it need not be, in the preferred embodiment, the element 27 is pivoted on a pin 28 that is integral with one wall of the disc 26. The fan-shaped element 27 includes a half-nut portion 29, and an adjoining enlarged recessed portion 30 about its transverse central axis. It also has fixed to its outer edge an actuating lever 31 that extends outwardly through a passage 32 within the side wall of the hollow disc 26. A leaf spring 33 is also located within the hollow disc 26, and it is so arranged that it resiliently urges the cam element 27 in a counterclockwise direction about the pivot 28 (Fig. 3), thereby effecting engagement between the half-nut portion 29 of the member 27 and the threads on the threaded shaft 17. A removable cover plate 34 is provided for completing the hollow disc 26, thereby excluding the admission of dirt to, or the tampering with the mechanism therewithin. The longitudinal extent of the recess 13 (Fig. 1) is such that the disc 26 and operating lever 31 can be rotated without interference with the body member 10. Accordingly, with the parts in the condition shown in Figs. 1 and 3, rotation of the disc 26 in either direction will effect a micrometric movement of the scriber 23 toward or from the centering point 11. When it is desired to make a quick adjustment of the scribing element 23 relatively to the centering point 11, either toward or from the latter, it is only necessary to move the operating lever 31 downwardly to a point as shown in Fig. 4. This action pivots the element 27 clockwise about the point 28 such that the half-nut portion 29 is moved out of threading engagement with the threaded shaft 17 which latter is then received within the recess 30. Accordingly, the threaded shaft may be made to slide freely through the body member 10 as well as the disc 26. Immediately upon removal of the pressure on the operating lever 31, the spring 33 returns the fan-like element 27 to a point where the half-nut portion 29 thereof cooperates with the threads on the threaded shaft 17.

Although the various features of the improved compass or scriber have been shown and described in detail to fully disclose one embodiment of the invention, it will be evident that numerous changes may be made in such details, and certain features may be used without others, without departing from the principles of the invention.

What is claimed is:

1. A compass comprising in combination, a body member; a centering element adjustably held in one end of said body member; a scribe-supporting member; a threaded shaft fixed to one of said members and slidingly received by the other of said members; a bar fixed to one of said members, parallel with said threaded shaft and slidingly received in said other member; a rotatable, hollow disc member slidably receiving said threaded shaft and mounted on the member that slidingly receives said threaded shaft; a half-nut element mounted within said hollow disc; a leaf spring mounted within said hollow disc and in cooperating position relatively to said half-nut, to thereby urge said half-nut into cooperating relationship with the threads on said threaded shaft; and an operating lever connected to said half-nut element and extending out through the side wall of said hollow disc member, the construction and arrangement of the parts being such that said hollow disc member with the operating lever extending outwardly therefrom can be rotated without interfering with the member supporting it.

2. A compass comprising in combination, a body member; a centering element adjustably held in one end of said body member; a scribe-supporting member; a threaded shaft fixed to one of said members and slidingly received by said other member; a bar fixed to one of said members, parallel with said threaded shaft and slidingly received by said other member; a rotatable, hollow disc-like member slidably receiving said threaded shaft and mounted on the member that slidingly receives said threaded shaft; a half-nut element pivotally mounted within the hollow portion of said rotatable member; a leaf spring also mounted within the hollow portion of said rotatable disc member in position to resiliently urge said half-nut element into cooperating position relatively to said threaded shaft; and an operating lever connected to said half-nut element and extending outwardly through the fall of said hollow disc-like member for pivoting said half-nut element out of cooperating position relatively to said threaded shaft.

3. A compass comprising in combination, a body member; a centering element adjustably held in one end of said body member; a scribe-supporting member; a threaded shaft fixed to said scribe-supporting member and slidingly received by said body member; a bar fixed to said scribe-supporting member, parallel with said threaded shaft and slidingly received by said body member; a rotatable, hollow disc-like member slidably receiving said threaded shaft and mounted on said body member; a half-nut element supported within said hollow disc-like member; a leaf spring also mounted within said hollow disc-like member in position to urge said half-nut element into cooperating position relatively to the threads on said threaded shaft; and an operating lever connected to said half-nut element and extending outwardly through an opening in the side wall of said hollow disc-like member for moving said half-nut element out of cooperating position with said threaded shaft.

4. A compass comprising in combination, a body member; a centering element adjustably held in one end of said body member; a scribe-supporting member; a threaded shaft fixed to said scribe-supporting member and slidingly received by said body member; a bar fixed to said scribe-supporting member, parallel with said threaded shaft and slidingly received by said body member; a rotatable, hollow disc-like member slidably receiving said threaded shaft and mounted on said body member; a half-nut element pivotally mounted within said hollow disc-like member; a leaf spring also mounted within said hollow disc-like member in position urging said half-nut element into cooperating position relatively to said threaded shaft; and an operating lever connected to said half-nut element and extending outwardly through an opening in the side wall of said hollow disc-like member for pivoting said half-nut element out of cooperating position relatively to said threaded shaft.

References Cited in the file of this patent

UNITED STATES PATENTS

| | | |
|---|---|---|
| 142,823 | Toulmin | Sept. 16, 1873 |
| 302,079 | Winn | July 15, 1884 |
| 764,937 | Friedman | July 12, 1904 |
| 1,096,663 | Archey | May 12, 1914 |
| 1,429,050 | Sylvester | Sept. 12, 1922 |
| 2,324,041 | Suverkrop | July 13, 1943 |